Patented June 10, 1952

2,599,799

UNITED STATES PATENT OFFICE 2,599,799

ETHERS OF POLYMERIZED EPIHALOHYDRIN

Harold Wittcoff, Minneapolis, Minn., assignor to General Mills, Inc., a corporation of Delaware No Drawing. Application February 24, 1948, Serial No. 10,562

5 Claims. (Cl. 260—615)

The present invention relates to ethers of polymerized epihalohydrin. These ethers have the following unit structure:

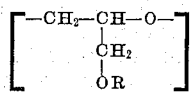

in which R represents any of a wide variety of organic radicals.

The compounds of the present invention possess a wide variety of properties depending upon the selection of the particular etherifying group R, and depending upon the extent to which the epihalohydrin has been polymerized, and further depending upon the degree to which the polymerized epihalohydrin has been etherified. These compounds possess a high degree of functionality which renders them extremely useful for further syntheses.

It is, therefore, an object of the present invention to provide ethers of polymerized epihalohydrin.

In preparing the ethers, it is desirable to start with polymerized epihalohydrin. This compound may be prepared by a variety of procedures. One desirable method involves the treatment of epihalohydrin in a solution, for example in carbon tetrachloride, with a complex of boron trifluoride-ethyl ether. The size of the polymer may be varied depending upon the selection of the solvent, concentration of catalyst, and the time and temperature, increases in time, temperature, and concentration of catalyst increasing the size of the polymer. While very large polymers may be obtained, it has been found that those which are most desirable are those in which the polymer is built up from 2 to 50 epihalohydrin units, and of these, the ones in which the number of units is from 6-12 are preferred. Numerous other methods of polymerizing epihalohydrin may also be used, as, for example, by the use of a basic catalyst under pressure. The particular method by which the epihalohydrin is polymerized does not form a part of the present invention.

The etherification of the polymerized epihalohydrin may be carried out by various procedures such as direct reaction with an alkoxide either in an excess of the alcohol from which the alkoxide has been made, or in an inert solvent. Etherification may also be effected by treating the etherifying alcohol with concentrated aqueous alkali in the presence of the polymerized epihalohydrin. In addition numerous other methods of etherification by means of halides which are well known to the art may be used.

As was pointed out, the properties of the resultant ethers depend to a large degree upon the nature of the etherifying alcohol and the present invention contemplates the use of a wide variety of alcohols for this purpose. Thus normal or branched chain saturated aliphatic alcohols containing from 1 to 18 or more carbon atoms may be used. When the R group in the formula given above is a lower aliphatic group containing from 1 to about 6 carbon atoms, such as methyl, ethyl, propyl, isopropyl, butyl, t-butyl, sec-butyl, and the like, viscous oils are obtained which are valuable as plasticizers. The use of higher alkyl groups, for example those containing from 10 to 18 carbon atoms, such as cetyl, octadecyl, and the like, results in high molecular weight solids valuable as waxes. The use of aralkyl alcohols, such as benzyl alcohol, substituted benzyl alcohols, phenylethyl alcohol, substituted phenylethyl alcohols, and the like, results in ethers which are viscous liquids which are also valuable as plasticizers. Aromatic hydroxy compounds such as phenol, t-butylphenol, phenylphenol, naphthol, and the like, may also be used for the purpose of the present invention, and may be used as plasticizers.

The employment of unsaturated alcohols is highly desirable for the production of a variety of materials which possess the valuable property of being capable of polymerization. Among the alcohols valuable for this purpose are allyl, methallyl, ethylallyl, cinnamyl, crotyl, chloroallyl, chorocrotyl, propargyl, methylvinyl, carbinyl, divinyl carbinyl, and in fact any similar unsaturated alcohol.

Numerous novel properties are found in such unsaturated ether compounds. These advantages include the fact that it is possible to produce a product having a high degree of unsaturation which lends itself to rapid polymerization. These products may be polymerized to yield light colored to water-white, clear, highly transparent, infusible polymers which are extremely hard and insoluble and which are heat resistant and fireproof. Inasmuch as these polymers possess ether linkages as distinguished from the readily hydrolizable ester linkages of drying oils, the polymers display marked resistance to water, dilute acid, alkali, or other chemicals. Furthermore these polymers, when cast into films, demonstrate unusual adhesion to glass, wood and metal, and are particularly adaptable to application in the protective coating field.

With higher unsaturated alcohols such as linoleyl and linolenyl, and the alcohols resulting from the reduction of soybean oil, linseed oil, or any drying or semi-drying oil acids, there result drying compositions useful for the formulation of paints, varnishes, and other protective coating media.

Of extreme importance are dihydric alcohols such as ethylene glycol, propylene glycol, butylene glycol and the like. With, for example, ethylene glycol, a hydroxyl-containing ether results in which the hydroxyls are primary. This compound is a polyhydric alcohol with a multiplicity of primary hydroxyl groups which may be employed in the preparation of intermediates valuable in the protective coating industry. Such intermediates include semi-drying oil and drying oil fatty acid esters, rosin and modified rosin acid esters, mixed rosin acid and fatty acid esters, alkyds, modified alkyds and the like.

Substituted alcohols likewise yield valuable compositions. Thus with glycollic acid, lactic acid, beta-hydroxypropionic acid and other hydroxy acids there are obtained polycarboxylic acids. With nitro alcohols, polynitro compounds result. With 2-ethoxyethanol, related compounds, and other ether alcohols, compositions valuable as plasticizers result. Polyhydric alcohols such as glycerol, pentaerythritol, sorbitol and the like may also be used to obtain products which are of value in the protective coating industry. In such cases, however, care must be taken to prevent cross-linking with resultant gel formation.

The following examples will serve to illustrate the invention:

Example 1

One mole of epichlorohydrin was dissolved in 300 parts of carbon tetrachloride and was treated with 7.1 parts of boron trifluoride-ethyl ether complex at a rate such that the temperature did not rise above 40° C. During part of the addition, a cooling bath was necessary in order to maintain this temperature. Once the addition was completed, the reaction mixture was allowed to stir for an hour whereupon it was washed successively with water, dilute sodium carbonate solution and again with water. From the carbon tetrachloride solution there was obtained a high yield of a yellow viscous oil which was soluble in most of the organic solvents such as carbon tetrachloride, chloroform, benzene and acetone, but which was insoluble in water and only partially soluble in aliphatic alcohols such as butyl alcohol. The product possesed a chlorine content of 35.8% and a molecular weight of about 570.

To a solution of 27.5 parts of sodium and 1,000 parts of n-butyl alcohol was added a solution of 100 parts of the above polyepichlorohydrin in 500 parts of hot n-butyl alcohol. The mixture was refluxed and the course of the reaction was followed by titration with hydrochloric acid. crystalline sodium chloride settled out of the solution during the course of the reaction, and at the end of 4 hours titration indicated that the reaction was substantially complete. The sodium chloride was removed by filtration and the filtrate was evaporated to obtain an oil which was insoluble in water but which was readily soluble in methanol and ethanol and which was the desired butyl ether.

Example 2

To a solution of 66 parts of sodium in 2,000 parts of allyl alcohol was added a solution of 250 parts of polyepichlorohydrin of Example 1 in 500 parts of allyl alcohol. The reaction mixture was heated on the steam bath under reflux with stirring. The course of the reaction was followed by titration with standard hydrochloric acid. After a total reaction time of 11 hours the precipitated sodium chloride was filtered and was practically equivalent to the theoretical amount. The excess allyl alcohol was removed under reduced pressure and the residue was dissolved in ether and filtered from more inorganic material. The ether solution was washed well with water, saturated with sodium sulfate and then dried and desolvated to obtain a product with an iodine number of 237.9 and a chlorine content of about 1.6%. This indicated that a large percentage of the chlorine atoms had been replaced by the allyloxy groups.

The product was polymerized by heating on the steam bath while bubbling air through it. In this way it grew quite viscous. When treated with 0.1% manganese and 0.05% cobalt, films could be cast which could be baked in a short time to hard, flexible, resistant coatings.

Example 3

The benzyl ether was prepared by dissolving 132 parts of sodium in 3500 parts of benzyl alcohol. To this was added 500 parts of polyepichlorohydrin of Example 1 dissolved in 250 parts of benzyl alcohol. The mixture was stirred and heated on a steam bath for 22 hours. At the end of this time titration indicated that the reaction had proceeded practically to completion. The reaction mixture was worked up as indicated previously and the excess benzyl alcohol was removed by vacuum distillation. The viscous liquid which remained was water insoluble but was soluble in alcohols and organic solvents. It possessed about 3% chlorine indicating that most of the chlorine atoms had been replaced by benzyloxy groups.

Example 4

The glycol ether of polyepichlorohydrin was prepared by mixing 50 parts of the polymer of Example 1 with a solution of 11.5 parts of sodium in 93 parts of pure ethylene glycol. It was necessary to apply heat in order for the sodium to dissolve completely in the excess glycol. The reaction mixture was heated and stirred on the steam bath for 14 hours. At the end of this time the precipitated sodium chloride was removed by filtration and the filtrate was dissolved in absolute alcohol and made exactly neutral with concentrated hydrochloric acid. The mixture was filtered again and the filtrate was evaporated under reduced pressure. In order to remove the excess ethylene glycol the entire reaction mixture was acetonated. This was accomplished by treating 99 parts of the mixture with 90 parts of acetone, 100 parts of chloroform and one part of p-toluenesulfonic acid. The reaction mixture was refluxed in a flask to which was attached an 18-inch helices packed silver column which in turn was fitted with a water trap and a condenser. This mixture was refluxed for 11 hours and the course of the reaction was followed by the amount of water which was removed azeotropically. The resulting acetonated mixture was washed with dilute sodium hydroxide solution and then with water and was dried over sodium sulfate. The excess ethylene glycol which was then in the form of its acetone derivative could be distilled off very readily at low temperatures under reduced pressure since it boils at about 92° C. at atmospheric pressure. Removal of the volatile material left a residue which was shaken with dilute hydrochloric acid in order to remove any acetone residues which may have been present thereupon, and thereafter the volatile material was removed in vacuo to obtain the desired product in the form of a viscous oil.

While various modifications of this invention have been described, it is to be understood that the invention is not limited thereto, but may be varied within the scope of the following claims.

I claim as my invention:

1. Process of producing an ether of a linear polymer, the ether containing the following unit structure:

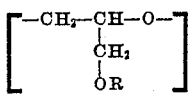

in which R is the residue of the etherifying agent, which comprises reacting a linear polymer of epichlorhydrin having the following unit structure

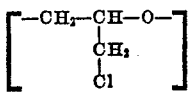

with an alcohol under alkaline conditions to produce said ether.

2. Process according to claim 1 in which the alcohol employed is an aliphatic alcohol.

3. Process according to claim 1 in which the alcohol employed is an unsaturated aliphatic alcohol.

4. Process according to claim 1 in which the alcohol employed is a saturated aliphatic alcohol.

5. Process according to claim 1 in which the alcohol employed is an aralkyl alcohol.

HAROLD WITTCOFF.

REFERENCES CITED

The following references are of record in the file of this patent:

UNITED STATES PATENTS

| Number | Name | Date |
|---|---|---|
| 2,161,937 | Scott | June 13, 1939 |
| 2,201,074 | Britton | May 14, 1940 |
| 2,380,185 | Marple | July 10, 1945 |
| 2,426,863 | Deebel | Sept. 2, 1947 |
| 2,450,234 | Evans et al. | Sept. 28, 1948 |

FOREIGN PATENTS

| Number | Country | Date |
|---|---|---|
| 477,843 | Great Britain | Jan. 3, 1938 |